(12) United States Patent
Deng

(10) Patent No.: US 9,185,506 B1
(45) Date of Patent: Nov. 10, 2015

(54) COMFORT NOISE GENERATION BASED ON NOISE ESTIMATION

(71) Applicant: Amazon Technologies, Inc., Seattle, WA (US)

(72) Inventor: Hongyang Deng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 14/108,121

(22) Filed: Dec. 16, 2013

(51) Int. Cl.
| H04B 3/20 | (2006.01) |
| H04R 3/02 | (2006.01) |
| G10L 21/02 | (2013.01) |
| H04R 29/00 | (2006.01) |
| G10K 11/175 | (2006.01) |
| H04B 3/23 | (2006.01) |
| H04M 9/08 | (2006.01) |
| G10L 21/0208 | (2013.01) |

(52) U.S. Cl.
CPC ............ *H04R 29/004* (2013.01); *G10K 11/175* (2013.01); *H04B 3/23* (2013.01); *H04M 9/082* (2013.01); *G10L 2021/02082* (2013.01)

(58) Field of Classification Search
None
See application file for complete search history.

(56) References Cited

U.S. PATENT DOCUMENTS

| 5,812,965 A * | 9/1998 | Massaloux | 704/205 |
| 6,643,617 B1 * | 11/2003 | Wood et al. | 704/226 |
| 2003/0093270 A1* | 5/2003 | Domer | 704/227 |
| 2014/0198923 A1* | 7/2014 | Miet et al. | 381/66 |

* cited by examiner

*Primary Examiner* — Andrew L Sniezek
(74) *Attorney, Agent, or Firm* — Knobbe, Martens, Olson & Bear, LLP

(57) ABSTRACT

Features are disclosed for generating comfort noise that matches a frequency spectrum of original background noise. For example, a spectral shape of an estimated noise component can be determined. A frame of white noise can be modified based at least in part on the spectral shape of the noise component. The modified frame of white noise can be converted to a time-domain noise signal. The level of the time-domain noise signal can be adjusted to match an original level of the noise after noise reduction. Residual echo suppression can sometimes cause background noise to be eliminated, causing silence. The adjusted time-domain noise signal can be added after residual echo suppression to maintain continuity of background noise levels.

21 Claims, 6 Drawing Sheets

COMFORT NOISE GENERATION BASED ON NOISE ESTIMATION

BACKGROUND

Many communication devices configured to obtain audio data of user utterances include both a loudspeaker and a microphone. The loudspeaker is used to play audio signals, such as speech from a remote source during a telephone call, audio content presented from local storage or streamed from a network etc. The microphone is used to capture audio signals from a local source, such as a user speaking voice commands or other utterances. An acoustic echo occurs when the remote signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. For example, the AEC may filter the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate can be obtained by applying a transformation to a reference signal that corresponds to the remote signal emitted from the loudspeaker. In addition, the transformation can be implemented using an adaptive algorithm. For example, adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC to can adapt its echo estimates to the local environment in which it operates.

Many communication devices also include a noise reduction ("NR") module. In addition to user utterances and acoustic echo, background noise is typically present in any environment. The NR module can use a noise reduction algorithm to reduce the level of background noise present in an audio signal. Typically, the NR module reduces but does not entirely eliminate the level of noise in the audio signal.

In addition, communication devices may also use a residual echo suppressor ("RES"). Various factors, including nonlinearity and noise, can cause an echo to not be completely eliminated by an acoustic echo canceller. A residual echo suppressor may be used to further reduce the level of echo that remains after processing by an acoustic echo canceller. For example, residual echo suppressors may use nonlinear processing to further reduce the echo level. In addition to echo, however, processing by a residual echo suppressor often eliminates noise as well. For example, a residual echo suppressor can receive an audio signal that already has reduced levels of noise after processing from the NR module and further process the signal so that the level of noise is wiped out completely.

This processing by the residual echo suppressor can have the undesirable effect of creating silence in the audio output signal. For example, when a user is speaking an utterance, the residual echo suppressor further reduces residual echo, but a level of background noise remains present in the output signal. However, when a user stops speaking an utterance, the residual echo suppressor can eliminate any residual echo as well as the background noise that was present. The abrupt transition in an audio output signal that includes some level of background noise and one that does not (e.g., silence) can cause a listener to mistakenly believe that the communication link is dead. In addition, the frequent changes between listening to a signal that includes some level of background noise and one that does not can cause distraction to a listener.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
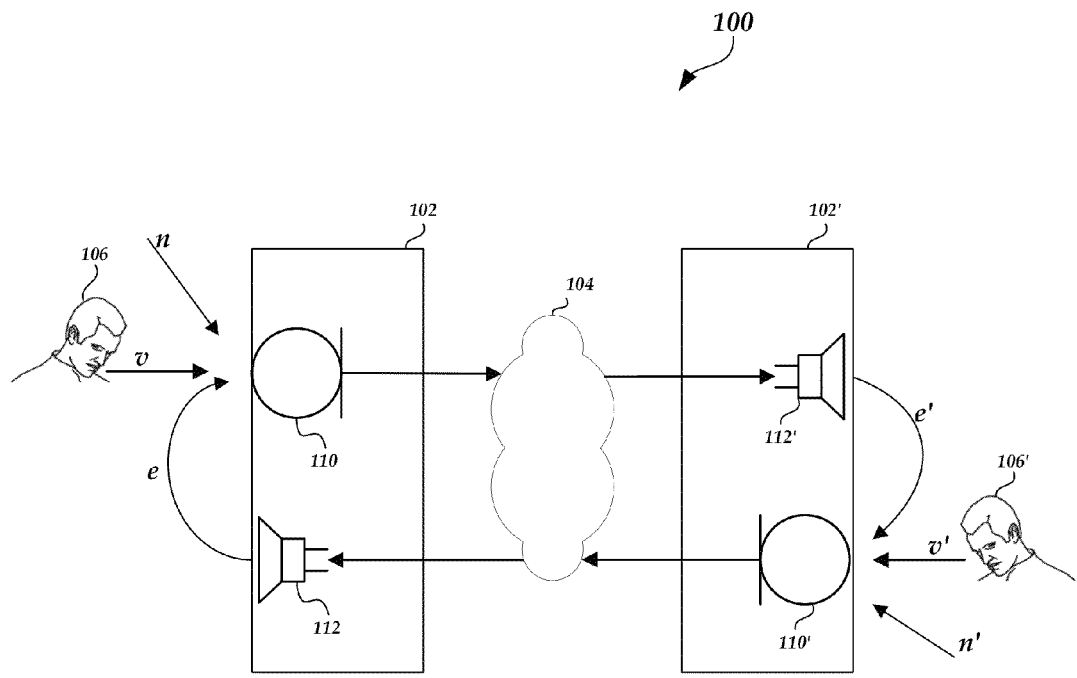
FIG. 1 is a block diagram of illustrative data flows and operations of a communication environment.

Communication devices, such as telephones and computing devices that present audio output and accept spoken input, may receive an acoustic echo of audio output as well as background noise in combination with spoken input. To a consumer of the spoken input, such as another party to a telephone call or an automatic speech recognition system, the noise and acoustic echo can interfere with spoken input and make it difficult to understand. Devices often include acoustic echo cancellers ("AECs") that attempt to remove acoustic echo from audio input, leaving only the spoken input (and environmental noise). Communication devices also often include a noise reduction ("NR") module to reduce the level of background noise present in an audio signal. Communication devices may also use a residual echo suppressor ("RES") to further reduce the level of echo that remains after processing by an acoustic echo canceller. In addition to echo, however, the processing by a residual echo suppressor often eliminates noise as well. This processing by the residual echo suppressor can have the undesirable effect of creating abrupt changes to silence in the audio output signal, which can cause a listener to mistakenly believe that the communication link is dead.

Aspects of the present disclosure relate to introducing comfort noise back into an audio signal processed by a residual echo suppressor. The comfort noise can match a frequency spectrum and amplitude level of the original background noise as reduced by the noise reduction module. By adding the comfort noise to the output of the residual echo suppressor, a listener can perceive a substantially constant level of background noise whether or not a user is speaking an utterance. By maintaining a substantially constant level of background noise, a listener will be informed that the communication link remains active.

In some aspects of the present disclosure, a communication device includes a microphone configured to detect sound as an audio input signal. The communication device can further include a memory configured to store a plurality of frames of white noise. In some embodiments, each frame of white noise can correspond to an index. One or more processors may be in communication with the microphone and the memory. The one or more processors may be configured to perform acoustic echo cancellation on the audio input signal to generate an echo-reduced signal. The one or more processors also may be configured to perform noise reduction to reduce a noise component from the echo-reduced signal and generate a noise-reduced echo-reduced signal. In addition, the one or more processors may be configured to perform residual echo suppression on the noise-reduced echo-reduced signal to further reduce echo of the noise-reduced echo-reduced signal and generate a residual-echo-reduced signal. The one or more processors also may be configured to determine a spectral shape of the noise component. For example, determining the spectral shape may include determining a spectral gain for a plurality of frequency bins. In addition, the one or more processors may be configured to modify a frame of noise based at least in part on the spectral shape of the noise component. In some embodiments, the frame of noise is received from the memory, the frame of noise corresponding to a generated random index. In addition, the one or more processors may be configured to modify the frame of white noise based at least in part on the spectral shape of the noise component. The one or more processors also may be configured to generate a modified noise signal using the spectral shape. For example, the modified noise signal may be created by computing a spectrum of the frame of noise, applying the spectral shape, and converting the modified noise signal back into the time domain to obtain a modified noise signal. In addition, the one or more processors may be configured to combine the modified noise signal with the residual-echo-reduced signal to generate an output signal.

In some embodiments, the one or more processors may be configured to estimate a level of noise in the noise-reduced echo-reduced signal. In addition, the one or more processors may be configured to adjust a level of the time-domain noise signal to approximate the level of noise in the noise-reduced echo-reduced signal.

In some embodiments, the one or more processors may be configured to determine a power spectrum density of the noise component at a plurality of frequency bands. For example, in some embodiments, the plurality of frequency bands comprises approximately thirty frequency bands spaced between zero and eight kilohertz. The one or more processors also may be configured to determine which of the plurality of frequency bands corresponds to a maximum of the power spectrum density. In addition, the one or more processors may be configured to normalize each of the plurality of frequency bands of the power spectrum density relative to the maximum to generate a normalized noise power spectrum density. The one or more processors also may be configured to calculate a square root of the normalized noise power spectrum density to determine the spectral shape of the noise component.

Although aspects of the embodiments described in the disclosure will focus, for the purpose of illustration, with respect to a local device using comfort noise generation, one skilled in the art will appreciate that the techniques disclosed herein may be applied to any number of processes or applications performing comfort noise generation. Various aspects of the disclosure will now be described with regard to certain examples and embodiments, which are intended to illustrate but not limit the disclosure.

Communication System Environment

With reference to an illustrative embodiment, FIG. 1 shows example interactions and data flows in a communication environment 100 between communication devices 102 and 102', communication link 104, and a users 106 and 106'. In particular, a communication device 102 generally can comprise a microphone 110 and a speaker 112. Similarly, communication device 102' comprises a microphone 110' and a speaker 112'. Both communication devices 102 and 102' can communicate with communication link 104.

The microphone 110 of communication device 102 generally detects sound from at least three sources when generating an audio input signal. For example, when user 106 speaks an utterance, the user's voice v is detected by the microphone 110. In addition, background noise n present in the user's environment is detected by the microphone 110. In addition, speaker 112 produces sound, creating an acoustic echo e that is detected by the microphone 110. Thus, an audio input signal detected by the microphone 110 includes components attributable to the user's voice v, the background noise n, and the acoustic echo e.

After processing the audio input signal, the communication device 102 generally sends an output signal through the communication link 104 to the receiving communication device 102'. The communication link 104 may be a telephone network, a data network, or a combination of the two. In addition, the communication link 104 may be a wired network, a wireless network, or a combination of the two. For example, the communication network may be a landline telephone network, a cellular network, or combinations of the same. The communication link 104 may be a personal area network, a local area network (LAN), a wide area network (WAN), or combinations of the same. Protocols and components for communicating via any of the other aforementioned types of communication networks, including TCP/IP protocols, can be used in the communication link 104.

Upon receipt of the audio output signal, the receiving communication device 102' generally presents the received audio signal through speaker 112'. As the output of the speaker reverberates around the environment of the receiving user 106', and acoustic echo e' may be generated. In addition, the user 106' may speak an utterance, producing sound v'. Also, the environment of the user 106' has background noise n'. Each of the sounds e', v', and n' may be detected by the microphone 110'.

For example, when user 106 speaks an utterance, the user's voice v is detected by the microphone 110. In addition, background noise n present in the user's environment is detected by the microphone 110. In addition, speaker 112 produces sound, creating an acoustic echo e that is detected by the microphone 110. Thus, an audio input signal detected by the microphone 110 includes components attributable to the user's voice v, the background noise n, and the acoustic echo e. After processing the audio input signal, the communication device 102' generally sends an output signal through the communication link 104 to communication device 102.

To the user 106' at the receiving communication device 102', the noise n and acoustic echo e at the sending communication device 102 can interfere with spoken input v and make it difficult to understand. The communication device 102 may include an acoustic echo canceller that attempts to remove acoustic echo from audio input. The communication device 102 also may include a noise reduction module to reduce the level of noise n present in an audio signal. In addition, communication device 102 may also include a residual echo suppressor to further reduce the level of echo that remains after processing by an acoustic echo canceller. In addition to echo, however, the processing by a residual echo suppressor often eliminates noise as well. This processing by the residual echo suppressor can have the undesirable effect of creating abrupt changes to silence in the audio output signal sent from the communication device 102 to the communication device 102', which can cause the user 106' to mistakenly believe that the communication link 4 is disconnected, or dead.

Figure 2:
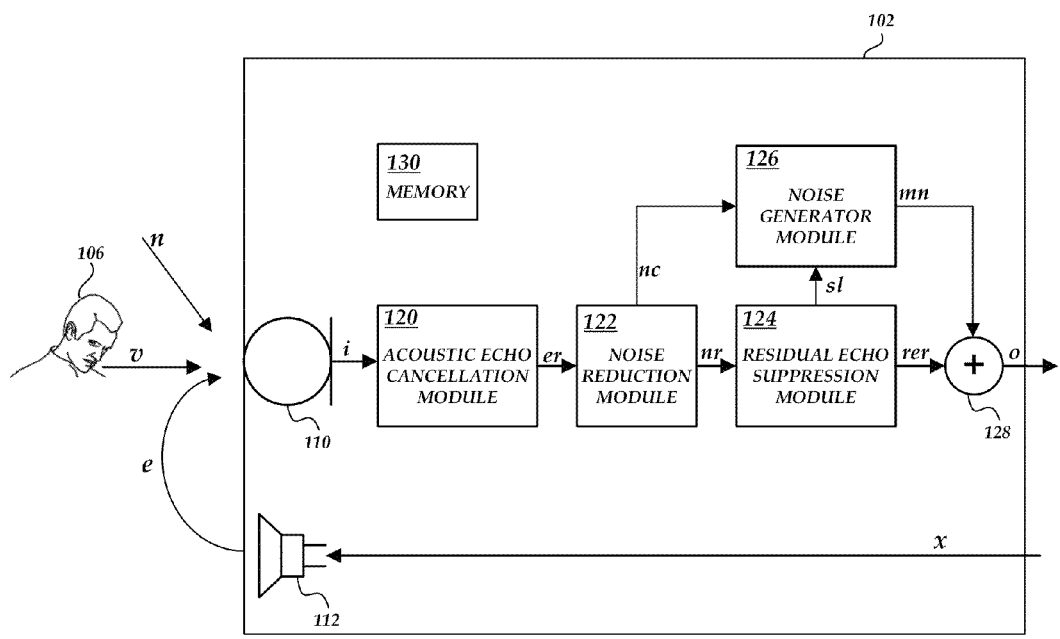
FIG. 2 is a block diagram of illustrative data flows and operations of a communication device comprising a noise generator module according to an embodiment.

FIG. 2 illustrates a communication device 102 according to an embodiment that comprises an acoustic echo cancellation module 120, a noise reduction module 122, a residual echo suppression module 124, a noise generator module 126, and a summation module 128. The communication system 102 can correspond to a wide variety of electronic devices or some combination thereof. In some embodiments, the communication system 102 may be a computing device that includes one or more processors and a memory 130 which may contain software applications executed by the processors. For example, each of the acoustic echo cancellation module 120, noise reduction module 122, residual echo suppression module 124, noise generator module 126, and summation module 128 may be implemented by one or more processors running software applications executed by the processors.

The communication system 102 may include a microphone 110 or other audio input component for accepting speech input. The audio input signal i detected by the microphone 110 includes components attributable to user 106's voice v, the background noise n, and the acoustic echo e. For example, the acoustic echo e may be generated when the speaker 112 reproduces audio signal x, which may be received from another communication device.

The communication system 102 may include an acoustic echo cancellation module 120 to cancel acoustic echoes in the audio signal obtained from the microphone 110. For example, the acoustic echo cancellation module 120 receives the audio input signal i. The acoustic echo cancellation module 120 performs acoustic echo cancellation on the audio input signal i to generate an echo-reduced signal er.

The communication device 102 may include a noise reduction module 122 to reduce the level of noise n present in an audio signal. For example, the noise reduction module 122 receives the echo-reduced signal er. The noise reduction module 122 performs noise reduction to reduce a noise component nc from the echo-reduced signal er and generate a noise-reduced echo-reduced signal nr. Although the noise reduction module 122 reduces the level of noise present in the noise-reduced echo-reduced signal nr compared to full level of background noise n present in the echo-reduced signal er, the noise-reduced echo-reduced signal nr generally still contains an appreciable level of noise. For example, if the noise-reduced echo-reduced signal nr was played by a speaker, a listener generally would be able to perceive an amount of noise.

As part of the process of performing noise reduction, noise reduction module 122 generally estimates the noise component nc that is being reduced. The noise component nc approximately shares the same frequency characteristics as the background noise n.

In addition, communication device 102 may include a residual echo suppression module 124 to further reduce the level of echo that remains after processing by an acoustic echo canceller. For example, the residual echo suppression module 124 receives the noise-reduced echo-reduced signal nr from the noise reduction module 124. The residual echo suppression module 124 performs residual echo suppression on the noise-reduced echo-reduced signal to: (1) further reduce echo of the noise-reduced echo-reduced signal nr and (2) generate a residual-echo-reduced signal rer. In addition to further reducing echo, however, the residual echo suppression module 124 often eliminates noise as well. For example, the residual echo suppression module 124 sometimes eliminates the level of noise that is present in the noise-reduced echo-reduced signal nr. As a result, without added noise from the noise generator module 126, a listener may mistakenly believe that the communication link is disconnected, or dead.

To address this problem, the communication device 102 includes a noise generator module 126 to generate comfort noise that corresponds to a frequency spectrum of original background noise n, as described in greater detail below. However, it may not be desirable to for the noise generator module 126 to generate comfort noise for each frame. For example, when a signal level of the residual-echo-reduced signal rer generated by the residual echo suppression module drops below a threshold level, without comfort noise introduced into an output signal, a listener may hear a discontinuity in the output signal or mistakenly believe the communication link is dead. In particular, it may be desirable to generate comfort noise when it is determined that a level of near-end user speech in the audio input signal is below a threshold. For example, it would be desirable to generate comfort noise when there is no near-end speech at all. On the other hand, when a signal level of the residual-echo-reduced signal rer generated by the residual echo suppression module remains above a threshold level, a listener may be able to listen to the output signal without perceiving any discontinuities in the background noise level. For example, if it is determined that a level of near-end speech in the audio input signal is not below a threshold, then it may not be desirable to generate comfort noise.

In some embodiments, the residual echo suppression module may provide signal-level information sl of the residual-echo-reduced signal rer to the noise generator module 126. For example, the signal-level information sl may comprise a yes or no instruction to the noise generator module 126 regarding whether to generate comfort noise (e.g., with respect to a particular frame). The yes or no instruction whether to generate comfort noise may be based on a threshold level of the residual-echo-reduced signal rer. For example, if the signal level of the residual-echo-reduced signal rer drops below a signal level of the noise-reduced echo-reduced signal nr, the residual echo suppression module may provide a yes instruction to the noise generator module 126 to generate a frame of noise. Alternatively, the signal-level information sl may comprise information based on the signal level of the residual-echo-reduced signal rer, and the noise generator module 126 may use the signal-level information sl to decide whether to generate a frame of noise. In addition, the noise generator module 126 may receive the signal-level information sl for each frame of sound, and the noise generator module may be able to rapidly react to moments in which generating comfort noise is desirable and moments in which it is not.

Figure 3:
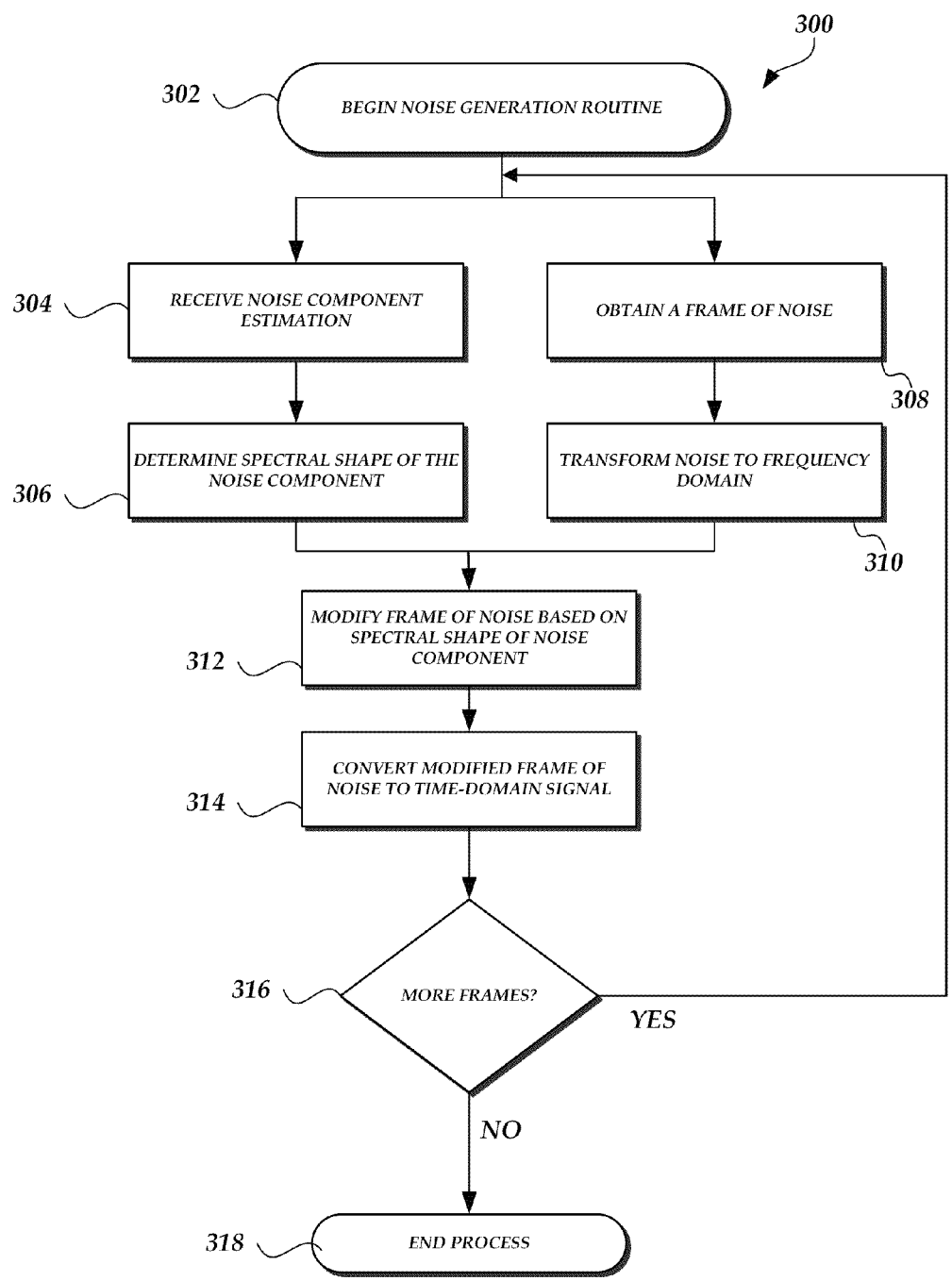
FIG. 3 is a flow diagram of an illustrative process for performing noise generation according to an embodiment.
Figure 4:
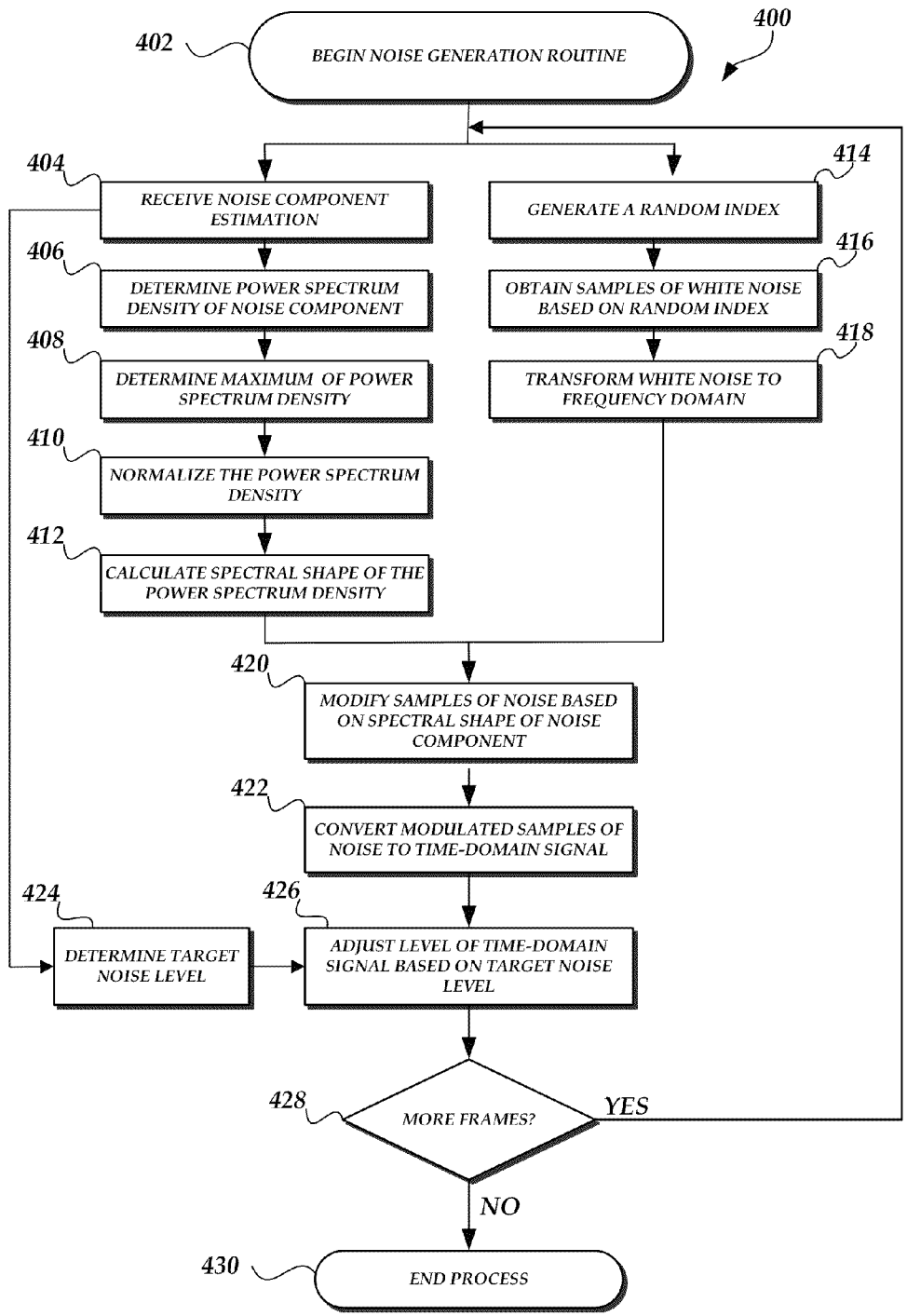
FIG. 4 is a flow diagram of another illustrative process for performing noise generation according to another embodiment.

In various embodiments, the noise generator module 126 may perform the processes described with respect to FIGS. 3 and 4. Generally, the noise generator module 126 receives the noise component nc estimated by the noise reduction module 122. The noise generator module 126 generates comfort noise that shares substantially the same frequency characteristics as the noise present in the noise-reduced echo-reduced signal nr.

For example, the noise generator module 126 can determine a spectral shape of the noise component nc. In addition, the noise generator module 126 can modify a frame of white noise based on the spectral shape of the noise component nc. Furthermore, the noise generator module 126 can generate a time-domain noise signal based on the modified frame of white noise. In addition, the noise generator module 126 can adjust a level of the generated comfort noise to approximate the level of noise in the noise-reduced echo-reduced signal.

The communication device 102 may include a summation module 128 that combines the output of the residual echo suppression module 124 and the noise generator module 126. For example, the summation module 128 can combine the time-domain noise signal mn with the residual-echo-reduced signal rer to generate an output signal o. In some embodiments, the summation module 128 simply sums the time-domain noise signal mn and the residual-echo-reduced signal rer to generate an output signal o. The output signal o may be sent directly through a communication link 104 to another communication device. Alternatively, the output signal o may be provided to a speech recognition module. In addition, the output signal o may be provided to a gain control module (e.g., if a destination for the output signal o was a wireless headset (e.g., a Bluetooth device), it may be desirable to increase the gain of the output signal o before sending to the headset).

Additional hardware and/or software modules or components may be included in the communication system 102. For example, the communication device 102 may include an automatic speech recognition ("ASR") module (not shown) for performing speech recognition on an audio signal that corresponds to a user utterance. The communication device 102 may also include a network communication module (not shown) for establishing communications over communication networks, such as communication link 104, or directly with other computing devices.

Illustratively, the communication system 102 may be (or be part of) a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), telephone, or some other electronic device or appliance.

Process for Generating Comfort Noise

With reference now to FIG. 3, an example process 300 for performing comfort noise generation according to an embodiment will be described. The process 300 begins at block 302. For example, if the noise generator module 126 receives signal level information sl indicating to generate comfort noise, the process 300 may begin. The process 300 may be embodied in hardware, a set of executable program instructions, or a combination of hardware and executable program instructions. The process 300 may be performed, for example, by the noise generator module 126 of the communication device 102 of FIG. 2. Although the process 300 of FIG. 3 will be described with respect to the components of FIG. 2, the process 300 is not limited to implementation by, or in conjunction with, any specific component shown in FIG. 2. In some embodiments, the process 300, or some variant thereof, may be implemented by alternative components, by the components of FIG. 2 in a different configuration, etc.

At block 304, the noise generator module 126 receives the noise component nc estimated by the noise reduction module 122. At block 306, the noise generator module determines the spectral shape of the noise component nc. For example, the noise generator module may determine the spectral shape of the power spectrum density of the noise component nc, as described below with respect to FIG. 4. In general, the spectral shape provides information with respect to the frequency characteristics of the noise component nc.

At block 308, the noise generator module 126 receives a frame of noise. For example, the communication device 102 may include a memory 130 configured to store a plurality of frames of noise. A frame of noise can be any plurality of samples of noise. In some embodiments, a frame of noise comprises 128 samples. The noise generator module 126 may receive the frame of noise from the memory 130. In order to not select the same frame of noise each time the process 300 is executed, which could create a pattern in the audio output signal that is perceivable to a listener, the noise generator module can randomly select the frame of noise from the memory 130 (e.g., based on an index). In alternative embodiments, the noise generator module 126, or another component of the communication device 102, may generate the received frame of noise. However, generating the frame of noise typically would require more computational resources than reading a randomly selected frame of noise from the memory 130.

In some embodiments, the received frame of noise is white noise. White noise generally has a substantially flat power spectral density. For example, white noise has approximately equal power within any frequency band of a fixed width.

At block 310, the noise generator module 126 may transform the received frame of noise to the frequency domain. For example, the noise generator module 126 may process a fast Fourier transform of the received frame of noise.

At block 312, the noise generator module 126 modifies the received frame of noise based at least in part on the spectral shape of the noise component nc. For example, the noise generator module 126 modifies the substantially flat power spectral density of the received frame of white noise to have approximately the same power spectral density as determined for the noise component nc. In other embodiments, the received frame of noise may not correspond to white noise. In such embodiments, the noise generator module 126 could modify the non-flat power spectral density of the received frame of white noise to have approximately the same power spectral density of the noise component nc by applying different weights that compensate for the received frame of noise not having flat power spectral density.

At block 314, the noise generator module 126 generates a time-domain noise signal mn based on the modified frame of noise. The noise generator module 126 may generate the time-domain noise signal mn by converting the modified frame of noise from the frequency domain to the time domain (e.g., by taking the inverse Fourier transform).

At block 316, the noise generator module 126 determines whether there are more audio frames to be processed. If so, the process repeats, beginning at blocks 304 and 308. For example, blocks 304, 306, 308, 310, 312, 314, and 316 may be executed in a continuous or substantially continuous loop until there are no more frames to be processed. For example, if the noise generator module 126 receives signal level information sl indicating to generate another frame of comfort noise, the process 300 may be repeated, beginning at blocks 304 and 308. After there are no more frames to be processed, the process 300 ends at block 318.

Turning now to FIG. 4, another example process 400 for performing comfort noise generation according to an embodiment will be described. The process 400 begins at block 402. The process 400 may be embodied in hardware, a set of executable program instructions, or a combination of hardware and executable program instructions. The process 400 may be performed, for example, by the noise generator module 126 of the communication device 102 of FIG. 2. Although the process 400 of FIG. 4 will be described with respect to the components of FIG. 2, the process 400 is not limited to implementation by, or in conjunction with, any specific component shown in FIG. 2. In some embodiments, the process 400, or some variant thereof, may be implemented by alternative components, by the components of FIG. 2 in a different configuration, etc.

At block 404, the noise generator module 126 receives the noise component nc estimated by the noise reduction module 122. At block 406, the noise generator module 126 determines the power spectrum density ("PSD") of the noise component nc. In determining the PSD of the noise component nc, the noise generator module generally converts the noise component nc from a time domain signal to a frequency domain signal. For example, the noise generator module 126 determines a power spectrum density of the noise component nc at a plurality of frequency bands. In some embodiments, the plurality of frequency bands comprises approximately thirty frequency bands spaced between zero and eight kilohertz. In other embodiments, the plurality of frequency bands can comprise fewer or more frequency bands spaced between a smaller or larger frequency range. For example, in other embodiments, the plurality of frequency bands can comprise 128 frequency bands spaced between zero and 10 kHz. In other embodiments, the plurality of frequency bands can comprise 256 frequency bands spaced between zero and 20 kHz. Generally, as the number of frequency bands increases, the computational complexity increases.

At block 408, the noise generator module 126 determines which of the plurality of frequency bands corresponds to a maximum of the power spectrum density of the noise component nc. For example, if the plurality of frequency bands comprises 30 frequency bands, the noise generator module 126 may determine which of the 30 frequency bands has a maximum amplitude.

At block 410, the noise generator module 126 normalizes each of the plurality of frequency bands of the power spectrum density of the noise component nc relative to the maximum as determined at block 408, in order to generate a normalized PSD noise component nc. For example, the noise generator module 126 may normalize by dividing the magnitude of the PSD noise component nc at each of the plurality of frequency bands by the maximum as determined at block 408. After normalizing, the magnitude of the PSD noise component nc at each of the plurality of frequency bands has a value of between zero and one.

At block 412, the noise generator module 126 uses the normalized PSD noise component nc to calculate a spectral shape of the PSD noise component nc. For example, in some embodiments, the noise generator module calculates a spectral shape of the PSD noise component nc by calculating a square root of the normalized noise PSD noise component nc at each of the plurality of frequency bands.

Turning to block 414, the noise generator module 126 may generate a random index. For example, the random index may be a number that corresponds to an index value at which white noise is stored in memory 130. In some embodiments, 10 frames of white noise can be stored in memory 130, and the generated random index would take on values between 1 and 10. In other embodiments, any number of frames of white noise can be stored in memory 130. For example, 100 frames of white noise can be stored in memory 130, and the generated random index would take on values between 1 and 100. In addition, a frame of white noise can include any number of samples. For example, in some embodiments, a frame of white noise can include 128 samples. In some embodiments, the generated random index corresponds to a sample of a frame of noise. For example, if in an embodiment a memory stores 100 frames of noise, and each frame of noise includes 128 samples, then the generated random index may be configured to specify one of the 12,800 sample values of noise. In other embodiments, the generated random index corresponds to a frame of noise.

At block 416, the noise generator module 126 receives a frame of white noise from the memory 130, the index of the received frame of white noise corresponding to the random index generated at block 414. By selecting the received frame of white noise based on a generated random number, the process 400 utilizes a technique that ensures that the same frame of white noise will not be selected each time the process 300 is executed, while reducing computational complexity compared to generating white noise on the fly. However, in alternative embodiments, the noise generator module 126, or another component of the communication device 102, may generate the received frame of white noise.

At block 418, the noise generator module 126 transforms the received frame of white noise from the time domain to the frequency domain. For example, the noise generator module 126 can perform spectral analysis, using the same technique applied to the noise component nc, to obtain the power density spectrum of the received frame of white noise. Although blocks 404, 406, 408, 410, and 412 have been described before blocks 414, 416, and 418, it should be understood that 404, 406, 408, 410, and 412 and blocks 414, 416, and 418 are independent and can be performed in either order.

At block 420, the noise generator module 126 modifies the received frame of noise based on the spectral shape of the noise component nc. For example, the noise generator module 126 modifies the substantially flat power spectral density of the received frame of white noise to have approximately the same power spectral density as determined for the noise component nc. To modify, the noise generator module 126 may, for each of the plurality of frequency bands, multiply the magnitude of the PSD of the frame of white noise by the value of the PSD of the noise component nc.

At block 422, the noise generator module 126 generates a time-domain noise signal mn based on the modified frame of noise from block 420. For example, the noise generator module 126 may generate the time-domain noise signal mn by converting the modified frame of noise from the frequency domain to the time domain (e.g., by taking the inverse Fourier transform).

At block 424, the noise generator module 126 can determine a target noise amplitude level for the time-domain noise signal mn. For example, in some embodiments, the target noise amplitude level is the same as the level of noise present in the noise-reduced echo-reduced signal nr, which can be indicated by the noise component nc estimated by noise reduction module 122. In other embodiments, a noise control knob, either physical or virtual, may be provided on the communication device 102 whereby a user 106 may adjust the amplitude of the time-domain noise signal mn. For example, if the volume of the time-domain noise signal mn is such that a listener may not be able to hear it, and may inadvertently think there may be a problem with the communication link 104, the user 106 can adjust the noise control knob to increase the amplitude of the comfort noise.

At block 426, the noise generator module 126 can adjust a level of the time-domain noise signal mn based on the target noise level from block 424. For example, the noise generator module can adjust a level of the time-domain noise signal mn to approximate the level of noise in the noise-reduced echo-reduced signal. By modifying the level of the time-domain noise signal mn to approximate the level of noise in the noise-reduced echo-reduced signal nr, the noise generator module 126 provides for a continuous level of noise output in the output signal o, even if the residual echo suppression module 124 had removed all noise from the residual-echo-reduced signal rer.

At block 428, the noise generator module 126 determines whether there are more audio frames to be processed. If so, the process repeats, beginning at blocks 404 and 414. The blocks of process 400 may be executed in a continuous or substantially continuous loop until there are no more frames to be processed. For example, if the noise generator module 126 receives signal level information sl indicating to generate another frame of comfort noise, the process 400 may be repeated, beginning at blocks 404 and 414. After there are no more frames to be processed, the process 400 ends at block 430.

Figure 5:
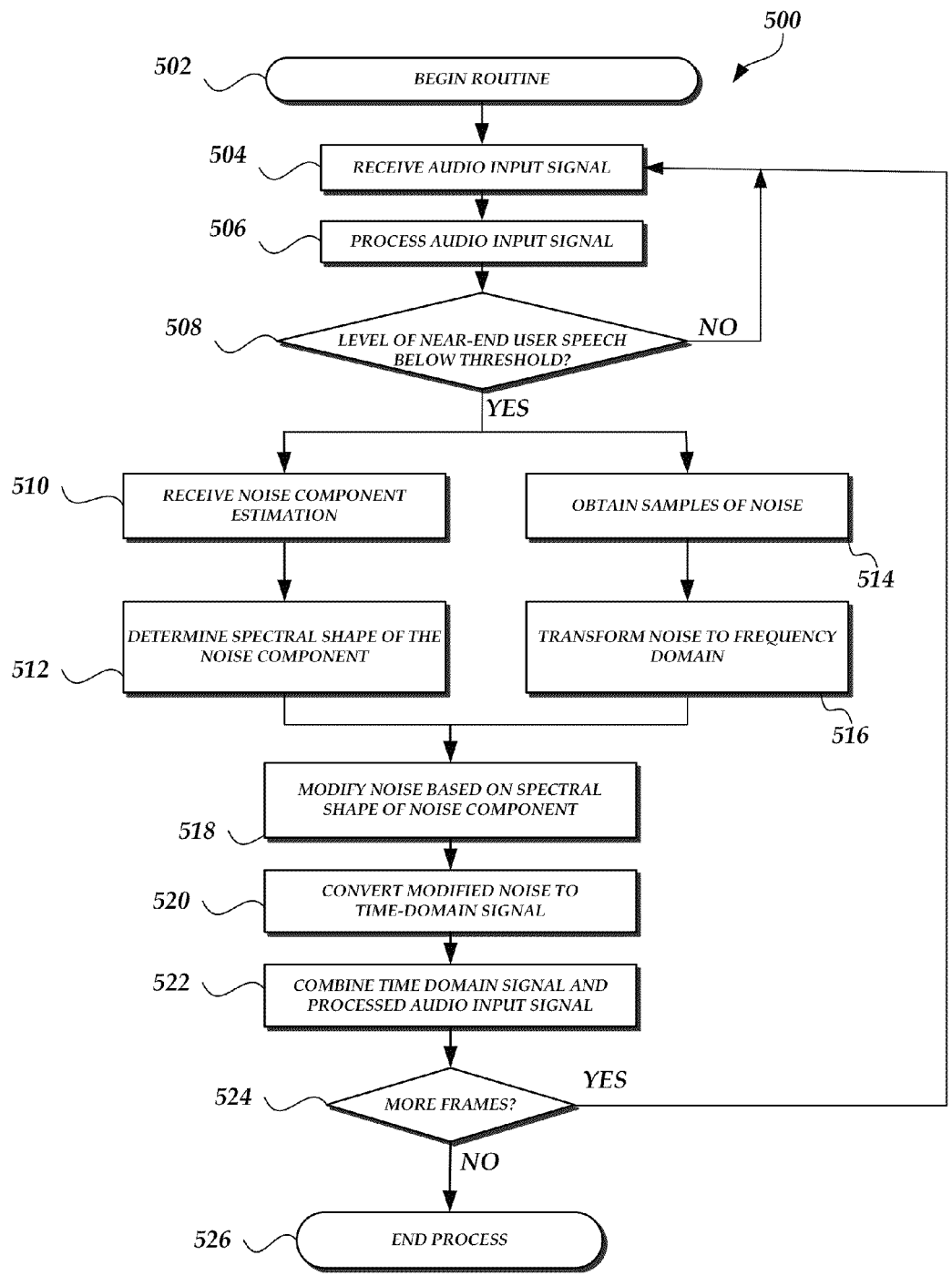
FIG. 5 is a flow diagram of an illustrative process for processing an audio signal according to an embodiment.

Turning now to FIG. 5, an example process 500 for processing an audio signal according to an embodiment will be described. The process 500 begins at block 502. The process 500 may be embodied in hardware, a set of executable program instructions, or a combination of hardware and executable program instructions. The process 500 may be performed, for example, by the noise generator module 126, as well as the acoustic echo cancellation module 120, noise reduction module 122, and/or residual echo suppression module 124, of the communication device 102 of FIG. 2. Although the process 500 of FIG. 5 will be described with respect to the components of FIG. 2, the process 500 is not limited to implementation by, or in conjunction with, any specific component shown in FIG. 2. In some embodiments, the process 500, or some variant thereof, may be implemented by alternative components, by the components of FIG. 2 in a different configuration, etc.

At block 504, the audio input signal is received. In some embodiments, the audio input signal includes user speech and a noise component nc. For example, the noise component nc may have been estimated by the noise reduction module 122. In addition, the audio input signal may have been generated by the noise reduction module 122.

At block 506, the audio input signal is processed. For example, in some embodiments, the processing in block 506 can be performed by the residual echo suppression module 124.

At block 508, it is determined whether a level of the user speech is below a threshold. For example, in a single talk condition in which a user 106 is not speaking, the level of the user speech will be below the threshold, and the residual echo suppression module 124 may be likely to remove the noise component in the audio input signal during the processing at block 506. Accordingly, if it is determined that a level of the user speech is below a threshold, it is desirable to add comfort noise back into the audio signal, and the routine proceeds to block 510. If it is determined that a level of the user speech is not below a threshold, the residual echo suppression module 124 may be unlikely to entirely remove the noise component in the audio input signal during the processing at block 506. Accordingly, it is not necessary to add comfort noise back into the audio signal, and the routine may proceed back to block 504.

At block 510, the noise generator module 126 receives the noise component nc. For example, the noise generator module 126 may receive the noise component estimated by the noise reduction module 122. At block 512, the noise generator module determines the spectral shape of the noise component nc. For example, the noise generator module may determine the spectral shape of the power spectrum density of the noise component nc, as described above with respect to FIG. 4.

At block 514, the noise generator module 514 receives a plurality of samples of noise. For example, the communication device 102 may include a memory 130 configured to store a plurality of samples of noise. The noise generator module 126 may receive the frame of noise from the memory 130. In order to not select the same starting sample of noise each time the process 500 is executed, which could create a pattern in the audio output signal that is perceivable to a listener, the noise generator module 126 can randomly select the starting sample of noise from the memory 130. For example, the starting sample of noise from the memory can be based on a generated random index. In alternative embodiments, the noise generator module 126, or another component of the communication device 102, may generate the received frame of noise. However, generating the frame of noise typically would require more computational resources than reading a randomly selected frame of noise from the memory 130.

In some embodiments, the received frame of noise is white noise. White noise generally has a substantially flat power spectral density. For example, white noise has approximately equal power within any frequency band of a fixed width.

At block 516, the noise generator module 126 may transform the received frame of noise to the frequency domain. For example, the noise generator module 126 may process a fast Fourier transform of the received frame of noise.

At block 518, the noise generator module 126 modifies the received samples of noise based at least in part on the spectral shape of the noise component nc. For example, the noise generator module 126 modifies the substantially flat power spectral density of the received samples of white noise to have approximately the same power spectral density as determined for the noise component nc. In other embodiments, the received samples of noise may not correspond to white noise. In such embodiments, the noise generator module 126 could modify the non-flat power spectral density of the received frame of white noise to have approximately the same power spectral density of the noise component nc by applying different weights that compensate for the received samples of noise not having flat power spectral density.

At block 520, the noise generator module 126 generates a time-domain noise signal mn based on the modified samples of noise. The noise generator module 126 may generate the time-domain noise signal mn by converting the modified samples of noise from the frequency domain to the time domain (e.g., by taking the inverse Fourier transform).

At block 522, the time domain noise signal mn is combined with the processed audio signal. For example, the summation module 128 may combine the time domain noise signal mn and the processed audio signal (e.g., the output of the residual echo suppression module 124). By combining, the summation module 128 may add comfort noise to compensate for noise unintentionally removed during processing of the audio signal.

At block 524, the noise generator module 126 determines whether there are more audio frames to be processed. If so, the process repeats, beginning at block 504. For example, blocks 504 through 522 may be executed in a continuous or substantially continuous loop until there are no more frames to be processed. After there are no more frames to be processed, the process 500 ends at block 526.

Noise PSD Examples

Figure 6A:
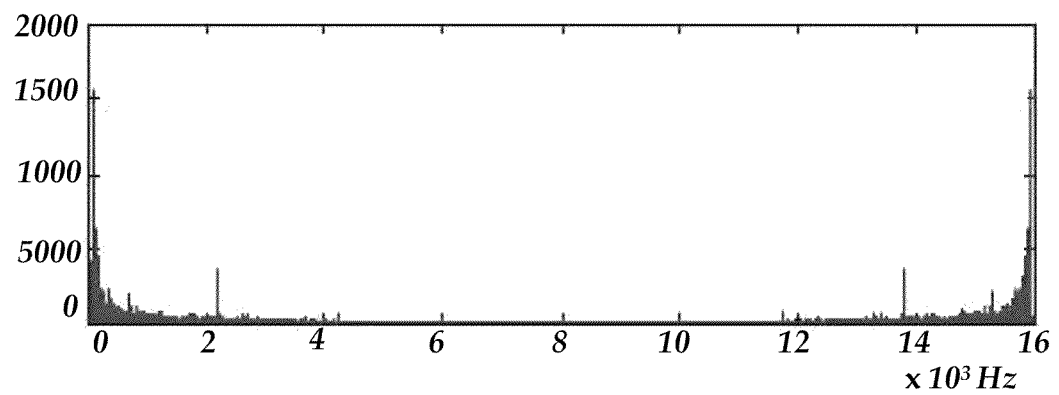
FIG. 6A is a diagram illustrating an example of a power spectrum density of background noise before noise reduction.

FIG. 6A is a diagram illustrating an example of a PSD of background noise n in a particular environment before noise reduction. The vertical axis indicates the amplitude of the PSD at a particular frequency. The background noise n includes measured frequencies between zero and eight kHz. To reduce computation complexity, the PSD between eight kHz and sixteen kHz is symmetric to the PSD between zero and eight kHz.

Figure 6B:
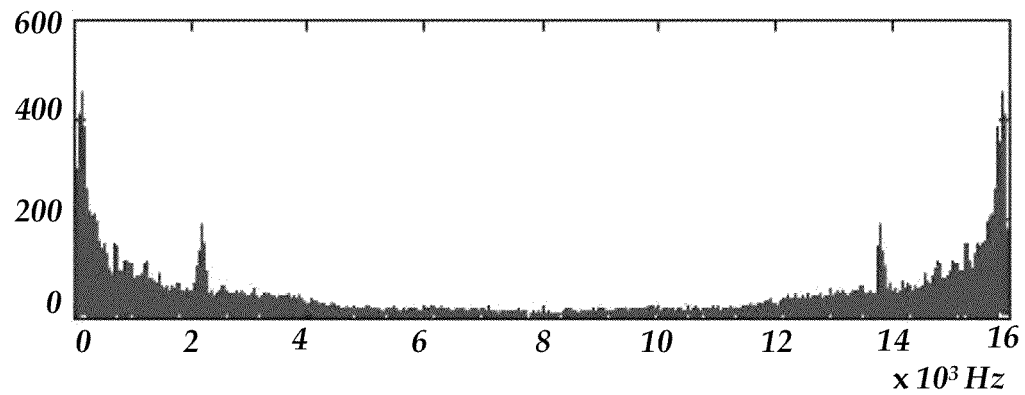
FIG. 6B is a diagram illustrating an example of a power spectrum density of comfort noise generated by a noise generator according to an embodiment.

FIG. 6B is a diagram illustrating an example of a power spectrum density of comfort noise generated by a noise generator according to an embodiment. As shown, the spectral density of the PSD of the generated noise is approximately the same as the PSD of the measured background noise shown in FIG. 6A. However, the spectral density of the PSD of the generated noise, as shown, has a reduced amplitude compared to the PSD of the measured background noise. This is because the level of the time-domain noise signal mn is set to approximate the lower level of noise in the noise-reduced echo-reduced signal produced by the noise reduction module 122, not the background noise level n.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A device comprising:
   a microphone configured to detect sound as an audio input signal;
   a memory configured to store a plurality of samples of white noise; and
   one or more processors in communication with the microphone and the memory, the one or more processors configured to:
   process the audio input signal;
   determine that near-end speech is not present in the audio input signal;
   determine a spectral shape of a noise component of the audio input signal;
   obtain a plurality of samples of white noise from the memory using a randomly generated index;
   obtain a modified noise signal by (1) obtaining a spectral representation of the plurality of samples of white noise, (2) applying the spectral shape to the spectral representation to obtain a modified spectral representation, and (3) converting the modified spectral representation back to a time domain signal to obtain the modified noise signal; and
   combine the modified noise signal with the processed audio input signal.

2. The device of claim 1, wherein the one or more processors are further configured to:
   estimate a level of the noise component; and
   wherein combining the modified noise signal with the processed audio signal comprises using the estimated level.

3. The device of claim 1, wherein the one or more processors are further configured to determine a power spectrum density of the noise component at a plurality of frequency bands.

4. The device of claim 3, wherein the one or more processors are further configured to:
   determine a frequency band that corresponds to a maximum of the power spectrum density;
   normalize each of the plurality of frequency bands of the power spectrum density relative to the maximum to generate a normalized noise power spectrum density.

5. The device of claim 1, further comprising a plurality of microphones.

6. A method comprising:
   receiving an audio input signal comprising a noise component;
   processing the audio input signal;
   determining that a level of near-end user speech in the audio input signal is below a threshold;
   determining a spectral shape of the noise component;
   obtaining a plurality of samples of noise from a memory using a randomly generated index;
   modifying the plurality of samples of noise based at least in part on the spectral shape of the noise component; and
   combining the modified noise signal with the processed audio input signal to generate an output signal.

7. The method of claim 6, wherein the audio input signal is received from a microphone.

8. The method of claim 7, wherein processing the audio signal comprises at least one of performing noise reduction and performing acoustic echo cancellation.

9. The method of claim 6, further comprising:
   estimating a level of the noise component; and
   wherein combining the modified noise signal with the processed audio signal comprises using the estimated level.

10. The method of claim 6, wherein determining the spectral shape of the noise component comprises determining a power spectrum density of the noise component at a plurality of frequency bands.

11. The method of claim 10, wherein determining the spectral shape of the noise component further comprises:
    determining a frequency band that corresponds to a maximum of the power spectrum density; and
    normalizing each of the plurality of frequency bands of the power spectrum density relative to the maximum to generate a normalized noise power spectrum density.

12. The method of claim 6, wherein the noise comprises white noise.

13. The method of claim 6, wherein modifying the plurality of samples of noise comprises:
    obtaining a spectral representation of the plurality of samples of noise;
    applying the spectral shape to the spectral representation to obtain a modified spectral representation; and
    converting the modified spectral representation back to a time domain signal to obtain the modified noise signal.

14. One or more non-transitory computer-readable storage media comprising computer-executable instructions to:
    receive an audio input signal comprising a noise component;
    process the audio input signal;
    determine that a level of near-end user speech in the audio input signal is below a threshold:
    determine a spectral shape of the noise component;
    obtain a plurality of samples of noise from a memory using a randomly generated index;
    modify the plurality of samples of noise based at least in part on the spectral shape of the noise component; and
    combine the modified noise signal with the processed audio input signal to generate an output signal.

15. The one or more non-transitory computer-readable storage media of claim 14, wherein the audio input signal is received from a microphone.

16. The one or more non-transitory computer-readable storage media of claim 15, wherein processing the audio signal comprises at least one of performing noise reduction and performing acoustic echo cancellation.

17. The one or more non-transitory computer-readable storage media of claim 14, further comprising computer-executable instructions to:
    estimate a level of the noise component; and
    wherein combining the modified noise signal with the processed audio signal comprises using the estimated level.

18. The one or more non-transitory computer-readable storage media of claim 14, further comprising computer-executable instructions to determine a power spectrum density of the noise component at a plurality of frequency bands.

19. The one or more non-transitory computer-readable storage media of claim 18, further comprising computer-executable instructions to:
    determine a frequency band that corresponds to a maximum of the power spectrum density; and
    normalize each of the plurality of frequency bands of the power spectrum density relative to the maximum to generate a normalized noise power spectrum density.

20. The one or more non-transitory computer-readable storage media of claim 14, wherein the noise comprises white noise.

21. The one or more non-transitory computer-readable storage media of claim 14, wherein modifying the plurality of samples of noise comprises:
    obtaining a spectral representation of the plurality of samples of noise;
    applying the spectral shape to the spectral representation to obtain a modified spectral representation; and
    converting the modified spectral representation back to a time domain signal to obtain the modified noise signal.

* * * * *